I. H. LEVIN.
ELECTROLYTIC APPARATUS.
APPLICATION FILED OCT. 25, 1915.

1,247,694.

Patented Nov. 27, 1917.

UNITED STATES PATENT OFFICE.

ISAAC H. LEVIN, OF NEWARK, NEW JERSEY.

ELECTROLYTIC APPARATUS.

1,247,694.  Specification of Letters Patent.  Patented Nov. 27, 1917.

Application filed October 25, 1915. Serial No. 57,728.

*To all whom it may concern:*

Be it known that I, ISAAC H. LEVIN, a citizen of the United States, residing at Newark, in the county of Essex and State of New Jersey, have invented certain new and useful Improvements in Electrolytic Apparatus, of which the following is a specification, reference being had therein to the accompanying drawings, which form a part thereof.

My invention relates to electrolytic apparatus and more particularly to improvements in apparatus of the filter press type.

The filter press type of electrolytic apparatus, utilizing a bi-polar electrode has certain advantages as compared with the multiple cell, uni-polar electrode type. It is more compact in its structure, and hence with a given floor space has greater capacity as to the production of gases. Furthermore, the electrolyte may be more conveniently supplied to the entire apparatus and the gas, and hydrostatic pressures within each cell may be equalized and controlled in a manner to insure greater purity in the gases produced in the apparatus.

In an apparatus made in accordance with my invention as shown in the accompanying drawings, I provide means whereby the electrolyte is delivered to each cell of the apparatus, under identical conditions and in a manner which will preclude a sufficiently rapid circulation of the electrolyte to tend to distort, or disintegrate, the diaphragm.
The gas off-take system of this apparatus is so constructed as to not only control the pressures within the several cells but to also separate the gas from the electrolyte carried along therewith, in a manner to avoid grounding of the current used in the apparatus, and the passage of such electrolyte to the gasometer or other receptacle for the gases produced. I also provide means in the off-take system by which back pressure upon the apparatus from the gasometer is prevented, which means has the further function of washing the gases or purging them of any particles of electrolyte.

An apparatus of the character herein referred to is usually employed to produce oxygen and hydrogen from an electrolyte composed of distilled water and caustic soda or caustic-potash. This electrolyte is stored in domes into which the gas from the various cells is delivered. The electrolyte passes from said domes to the several cells to replace the electrolyte decomposed in the cell. To maintain an electrolyte of substantially the same specific gravity throughout a run of an apparatus, I provide means whereby distilled water is continuously added to the body of electrolyte passing from the said domes to the cells.

In order that the operator may readily determine the level of the electrolyte in each dome and also the level of the distilled water in the water feed tank, I provide each of said domes and said tanks with a sight gage, the essential characteristic of which is that the liquid, the level of which is to be indicated by the gage, is that contained in the dome or tank itself as distinguished from that in a by-pass system communicating with said domes or said tank. Supplementing the sight gages of the gas domes, I provide an audible signal device adapted to be actuated by the gas in either dome when the level of the electrolyte has descended to a point where stoppage of the flow of the electrolyte to the cells is imminent by reason of the exhaustion of the supply of electrolyte in the domes or the clogging of some portion of the system.

In connection with the gas off-take system, I provide insulating pipe sections so arranged as to prevent the conduction of the electric current from the apparatus to the pipes leading to the gasometer or other receptacle for the gases. These insulating pipe sections are also so constructed as to tend to separate the gases from the liquids.

The invention consists in the novel features of construction and combination of parts hereinafter set forth and described and more particularly pointed out in the claims hereto appended.

Referring to the drawings:—

Fig. 7 is a detail view of the movable end electrode.

Like letters refer to like parts throughout the several views.

Figure 1:
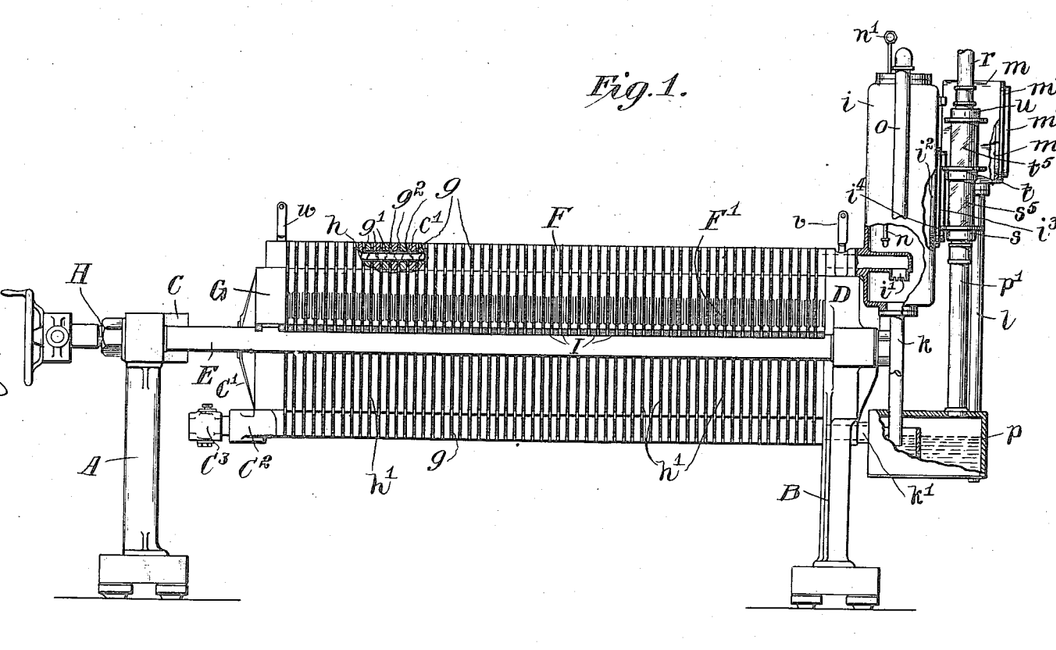
Figure 1 is a side elevation of an apparatus embodying my invention broken away at different points thereof;
Figure 2:
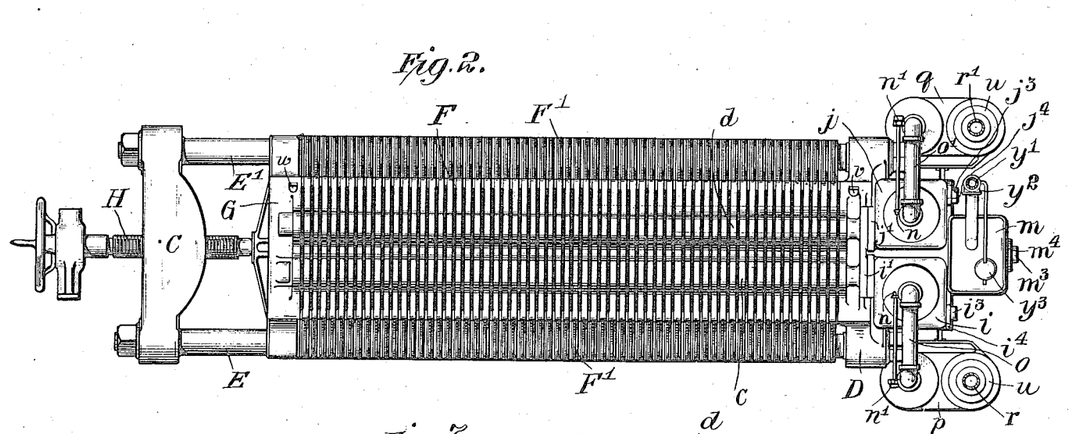
Fig. 2 is a plan view thereof broken away at different points thereof.
Figure 3:
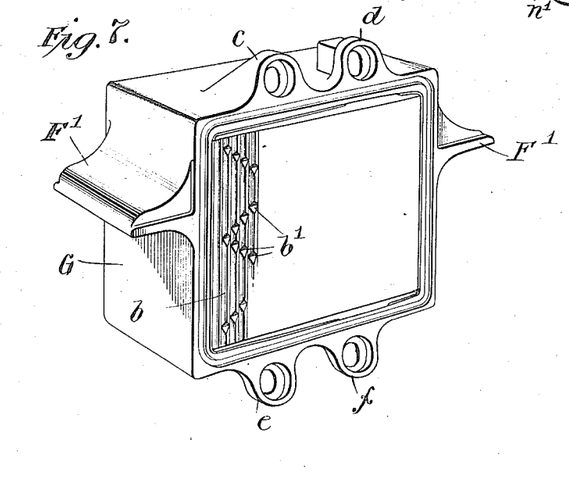
Fig. 3 is an end view thereof also broken away at different points thereof.

In the embodiment of my invention shown in the drawing, I have shown at A and B pedestals at opposite ends of the apparatus, one of which as A is provided with a crosshead C, and the other of which as B is provided with a head D forming one end electrode of the apparatus. The electrolyte supply feed system and the gas off-take system are also supported from said head D.

Extending from the cross-head C to the cross-head D upon opposite sides of the apparatus are supporting rods E—E' covered with a suitable insulating material, said rods supporting a series of bi-polar electrodes F. Also supported by the insulating rods E—E' is a movable head G adapted to be forced toward the head D by the clamp screw H for the purpose of developing sufficient pressure upon all of the bi-polar electrodes F to insure the formation of an air, and gas, tight joint between adjacent electrodes.

Figures 3, 4, 5, 6, 8:
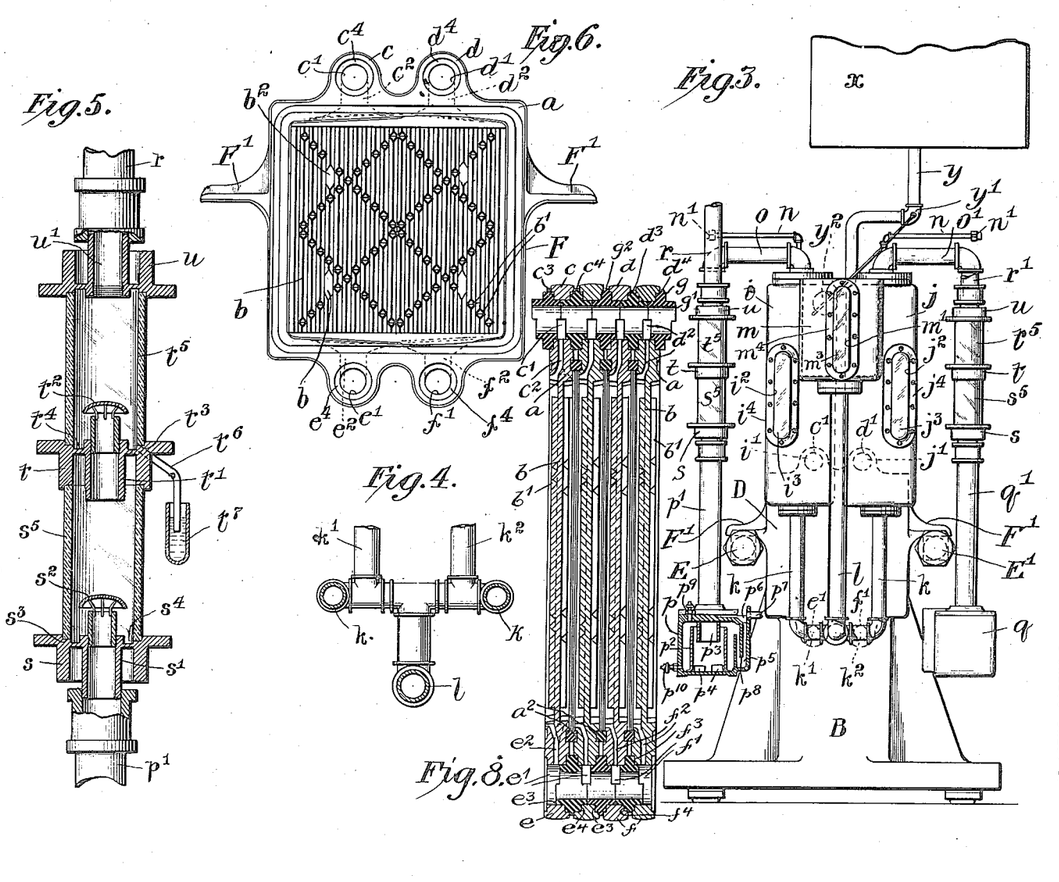
Fig. 4 is a plan view of a portion of the pipe system for delivering the electrolyte to the cells.
Fig. 5 is a detail view of one of the insulating sections of the off-take pipe in vertical section.
Fig. 6 is a detail view of one of the electrodes.
Fig. 8 is a vertical section through a group of electrodes, the section being shown in part through one electrolyte feed and gas offtake ducts and in part through the other electrolyte feed and gas offtake ducts.

Each of the electrodes F is provided upon opposite sides thereof with lugs F' adapted to project over the rods E—E'; and to secure a more perfect insulation of each of the electrodes, I preferably interpose between these lugs F' and the said rods, insulating blocks I of porcelain or other similar material. These blocks are slidable upon said rods, thus not only permitting that movement of the electrode necessary to secure a tight joint therebetween, but also facilitating the assembling of the apparatus.

Each of the electrodes F comprises a frame $a$ within which is a corrugated plate $b$, the corrugations of which preferably extend vertically thereof and are interrupted by a plurality of depressions $b'$ for the purpose of facilitating the flow of the electrolyte into and the gases from, the cell adjacent said plate. This plate is also provided with extended surfaces $b^2$ for preventing the buckling of the diaphragm with relation thereto.

The frame $a$ at the top thereof is provided with a lug $c$ having an opening $c'$ adapted to be alined with similar openings in other electrodes to form a gas off-take duct, the said opening $c'$ communicating with the inside of said frame through a short duct $c^2$ opening adjacent one side of said plate $b$. The frame $a$ is also provided at the top thereof with a second lug $d$ provided with an opening $d'$ which communicates with the other side of the plate $b$ through the duct $d^2$ for the purpose of drawing gases therefrom and delivering them to a duct formed by similar openings $d'$ in other electrodes. The lugs $c$—$d$ are spaced apart so that any gas leakage will be to atmosphere.

At the bottom of the frame $a$ are two lugs $e$—$f$ spaced apart and provided respectively with openings $e'$—$f'$ adapted to form electrolyte supply conduits with similar openings in the lugs of other electrodes, the openings $e'$—$f'$ communicating respectively with opposite sides of the plate $b$ through the ducts $e^2$—$f^2$. This general arrangement of electrode has been heretofore patented to me in and by Letters Patent #1,094,728.

The lugs $c$—$d$—$e$ and $f$ upon each side thereof adjacent the openings $c'$—$d'$—$e'$—$f'$ respectively are provided with countersunk portions $c^3$—$c^4$, $d^3$—$d^4$, $e^3$—$e^4$, $f^3$—$f^4$ forming a seat for insulating nipples, and each side of the frame $a$ of each electrode is provided with a channel as $a'$—$a^2$ forming a seat for the packing rim of the diaphragm interposed between the plates $b$ of adjacent electrodes. In the form of the invention shown, the functions of said insulating nipples and said packing rim are two-fold; first, to make the joints in the device formed by the openings in the lugs of succeeding electrodes, and the joint between the frames $a$ of succeeding electrodes, gas-tight and watertight; and second, to prevent the decomposition of the electrolyte while in the electrolyte feed and the gas off-take conduits or when between the frames $a$ with a resultant formation of both gases to be generated from such electrolyte. In this manner, I minimize the presence of impurities in the gases, and the precipitation of the salts upon the exterior of the apparatus. It is not my intention to claim the particular structure by which these results are secured in this application, such being made the subject matter of a separate application filed simultaneously herewith and bearing the Serial No. 57,727.

All of the insulating nipples are of the same construction and a description of but one of them will therefore be entered into. These nipples consist of an annular central portion $g$ adapted to seat in the countersunk portion, as $c^3$, of one electrode and $c^4$ of the adjacent electrode, and to be compressed therebetween. At each side of the annular flange $g$ is a cylindrical portion $g'$, the lower part of which is shorter than the upper part so as not to obstruct the short duct, as $c^2$ opening into the opening $c'$ and the cell upon one side of the plate $b$. The upper portion of said nipple is of a length to abut against the edge of the nipple between the succeeding electrode so as to form within the conduit made up by the openings $c'$ of the various electrodes a substantially continuous insulating lining. This nipple is made of soft rubber. At the top of the annular portion $g$ is a nub $g^2$ which serves as a guide in securing accuracy in the positioning of the nipple.

The diaphragm $h$ which is positioned between the plates $b$ of adjacent electrodes, consists of absorptive, gas-impervious material, asbestos usually being used, said diaphragm having its edge inclosed in a continuous bead or rim $h'$ of rubber adapted to seat in the channels $a'$ of adjacent electrodes. This bead is also of soft rubber.

Associated with each battery of cells are electrolyte feed and gas off-take mechanisms which are so constructed respectively as to supply electrolyte adjacent the anodes of the various cells through the ducts formed by the openings $f'$ and adjacent the cathode of various cells through the ducts formed by the openings $f'$, the arrangement being such that said electrolyte will not carry any gas bubbles of hydrogen through the ducts $e'$ or any bubbles of oxygen through the ducts $f'$. The supply of the electrolyte is continuous.

The gas off-take mechanism is so constructed as to regulate both the gas, and the hydrostatic, pressures within the apparatus and to prevent the commingling of the gases produced on opposite sides of each cell.

Carried by the head D, or supported in any other desired manner, are a plurality of independent gas domes $i$—$j$ adapted to receive and contain a sufficient volume of the electrolyte to insure an extended run of the apparatus. These domes respectively are in communication with the gas offtake conduits formed by the openings $c'$ and $d'$ through nozzles $i'$—$j'$ the discharge ends of which are presented toward the bottom of the domes and submerged in the electrolyte therein. The bottoms of said domes $i$—$j$ are connected by means of the pipe $k$ having therein branch leads $k'$—$k^2$ communicating respectively with the conduits formed by the opening $e'$—$f'$. In this manner both the hydrostatic, and the gas, pressure within the respective cells may be controlled, such pressures being determined by the relative levels of the discharge ends of the nozzles $i'$—$j'$. A differential of pressure upon opposite sides of the diaphragm in all of the cells may be secured by having the discharge ends of these nozzles upon different levels or the pressure may be equalized upon opposite sides of the diaphragm by having said discharges upon the same level. In this manner the seepage of gases through the diaphragm or the flow of the electrolyte therethrough may be reduced to a minimum; or if it be desired to have absolute purity of one of the gases, a preponderating pressure upon that side of the diaphragm in which this gas is generated will insure such absolute purity. Ordinarily it is desirable to have the pressure upon opposite sides of the diaphragm balanced or equalized.

Adjacent the gas domes $i$—$j$ is a feed water tank $m$, the height of this tank being above the normal level of the electrolyte in said domes. This tank is adapted to receive distilled water. Extending from said tank to the pipe $k$ connecting said domes is a pipe $l$ through which the distilled water is discharged into the electrolyte circulating system in a manner to constantly renew that portion of the electrolyte withdrawn from circulation through its decomposition.

Each of the domes $i$—$j$ has therein an opening as $i^2$—$j^2$ in the wall thereof, which opening is closed by means of a suitable packed plate of prismatic glass $i^3$—$j^3$ secured in place by the metallic rims $i^4$—$j^4$ secured to said domes.

The feed water tank $m$ also has through the wall thereof an opening $m'$ closed by the prismatic glass plate $m^2$ suitably packed, and held in place by means of the metallic rim $m^3$. By means of these prismatic glasses a sight gage is afforded which will indicate, with accuracy, the level of the electrolyte and the feed water in said dome, and in said feed water tank. By having the reading directly upon the interior of these domes and said tank, absolute accuracy in the gage is secured and the possibility of the gage not recording the exact level in the tank by reason of interference with the gage from the caustic soda or caustic potash in the solution, such as may result when a by-pass gage is used, is avoided.

It is desirable in apparatus of this character to provide for a continuous run thereof with as little attention as possible. While the employment of sight gages of the character above referred to is desirable as affording means for a convenient and quick inspection of the apparatus, it is also desirable to provide an audible signal which will apprise the operator of the lowering of the level of the electrolyte in the domes in a degree which will affect the production of gas by the generator.

To secure this desirable result, I mount in each dome a tube $n$, one end of which extends within the dome to a point slightly above the discharge level of the nozzle $i'$—$j'$ and the other end of which projects outwardly of said dome and is provided with a signal device as a whistle $n'$. In this manner when the level of the electrolyte falls to a point where the end of said tube within the dome is above the electrolyte, the gas in said dome will sound said whistle, or other signal, thus apprising the operator of the necessity for re-filling the feed tank, or of the presence of some obstruction in the feed water supply system. The arrangement of this tube is such as to insure the sounding of the signal before the level of the electrolyte has reached a point which will permit the escape of gas or interfere with the continued operation of the apparatus.

The head C is provided with tubular portions $C'$—$C^2$ adapted to be alined with the openings $e'$—$f'$ respectively said portions $C'$—$C^2$ being provided with valve controlled fittings $C^3$—$C^4$ by means of which the electrolyte may be drained from the apparatus. Leading from the top of the dome $i$ and from the top of the dome $j$ respectively are gas offtake pipes $o$—$o'$. These pipes respectively discharge into the purgers $p$—$q$, gas being conducted from these purgers through the pipes $p'$—$q'$.

The purgers $p$—$q$ are both constructed alike and a description of but one of them will therefore be entered into.

Within each of said purgers is a partition as $p^2$ open at the top and having ports $p^4$ adjacent the bottom thereof, this partition being centrally below the gas offtake pipe $o$. Dependent from the top of said purger and extending within said partition, is a nipple $p^3$ communicating with said pipe $o$. The lower end of this nipple projects below the normal level of water contained in said purger. The offtake pipe $p'$ communicates with said purger at a point above the normal water level within the purger thus allowing the free escape of gases but providing a liquid seal about the discharge end of the nipple $p^3$. The purger is provided with a well $p^5$ communicating with a trough $p^6$ at the top of the purger. The said trough $p^6$ is provided with an overflow pipe $p^7$. Pendent from the trough $p^6$ and projecting into the well $p^5$ is a partition $p^8$ forming with said cell a liquid seal normally preventing the escape of gases from the purger. At $p^9$ is a pet cock for relieving the pressure within the purger while it is being filled and at $p^{10}$ is a drain cock.

The pipes $p'$—$q'$ are in communication with pipes $r$—$r'$ leading to the gasometer or other receptacle for the gases, an insulated section being provided in said pipes $p'$—$r$ and $q'$—$r'$ to prevent the grounding of the current through said gasometer or other receptacle. Heretofore, this insulated section has consisted of a single section of rubber tubing permitting a continuous direct flow of the gases. This has not proven highly satisfactory as the gases carry with them sufficient moisture to form a continuous film which serves as a conductor for the current fed to the apparatus. To obviate this condition, I provide a special form of insulating section which has the advantage that while permitting a continuous flow of the gases, it prevents a direct flow thereof, in a manner to separate a material portion of the moisture from the gases. This separator consists of a cup-shaped fitting $s$ carried by the pipes $p'$—$q'$ respectively.

This fitting has a dependent nipple $s'$ between which and the outer wall of the fitting is a channel, the lower edge of said nipple projecting below the lower edge of said fitting. The fitting $s$ is surmounted by a baffle cap $s^2$ spaced away from the discharge end of the nipple $s'$ and positioned above said end so as to cause the gas passing through said nipple to impinge upon said cap. About the top of the fitting is a seat $s^3$ and within said fitting adjacent said seat is a trough $s^4$ in which the condensate is adapted to accumulate. In the seat $s^3$ is a glass tube $s^5$ between the lower edge of which and the said seat is a suitable gasket. The tube $s^5$ carries a fitting $t$ similar to the fitting $s$, provided with a nipple $t'$, baffle cap $t^2$ annular seat $t^3$ and trough $t^4$. A second glass tube $t^5$ is mounted in the seat $t^3$. The tube $t^5$ is surmounted by a fitting $u$ similar to the fittings $s$ and $t$ but inverted, the nipple $u'$ of said fitting being connected with the pipe $r$ or $r'$. This fitting does not have a baffle cap. The arrangement of the nipples $t'$ is such that any liquid flowing therethrough will strike the tube $s^5$ at a point below the fitting $t$ and thus prevent the formation of a liquid film throughout the entire length of this tube. In this manner I secure a series of insulating sections each of which has at the inlet end thereof a baffle which will not only prevent a direct flow of the gases, and any liquid contained in suspension therein, but will tend to separate the liquid from these gases and cause it to flow back into the gas off-take system adjacent the gas dome. Leading from the trough $t^4$ is a drain pipe $t^6$ the outlet end of which is provided with a liquid seal $t^7$ thus permitting the escape of liquid accumulated in said trough without permitting the escape of the gases.

The various electrodes constituting the battery of the apparatus are arranged in series one of the terminals being shown at $v$ and the other at $w$.

In connection with the tank $m$, I provide a storage tank $x$ for distilled water having an offtake pipe $y$ opening into the tank $m$. This pipe $y$ is controlled by an automatic valve $y'$ actuated by a float $y^2$ located in the tank $m$. By this means I am enabled to automatically renew the supply of water in the tank $m$ from a source of supply having greater capacity than said tank.

The operation of the herein described apparatus is substantially as follows:—

In starting the apparatus the domes $i$—$j$ are partially filled with electrolyte, which flows through the pipe $k$ and the leads $k'$—$k^2$ into the various cells through the conduits formed by the openings $e'$—$f'$; that flowing through the lead $k'$ entering said cells upon the anode side of the diaphragm, and that flowing through the lead $k^2$ entering the cells upon the cathode side of the diaphragm. In this manner the possibility of the electrolyte upon one side of the diaphragm becoming mixed with that upon the other side through a channel capable of carrying gases, is avoided. The insulation afforded by the nipples forming the lining of these conduits $e'$—$f'$ prevents decomposition of the electrolyte while flowing through these ducts.

Before the electrical circuit to the apparatus is closed, the electrolyte will have completely filled the cells and the conduits formed by the opening $c'$—$d'$, so that when the apparatus starts all of the conduits and all of the cells will be filled with the electrolyte.

The nipples forming the lining of the conduits formed by the opening $c'$—$d'$ respectively, and the insulating packing between the lugs $c$—$d$ will prevent the decomposition of the fluid in these ducts while the apparatus is in operation.

The apparatus having been filled, a supply of filtered water is poured into the tank $m$, and sufficient water is poured into each of the purgers $p$—$q$ to bring the level thereof above the level of the discharge end of the nipple $p^3$ and below the top of the partition $p^2$.

Current is then turned into the apparatus, with a resultant continuous decomposition of the electrolyte in all of the cells F. As the oxygen is freed adjacent the anode, it will bubble up through the passage $c^2$ and accumulate in the duct formed by the various openings $c'$ until the gas pressure developed, is sufficiently great to overcome the pressure at the discharge end of the nozzle $i'$, the gas escaping therefrom into the domes $i$. The gas passes upwardly through the electrolyte in said dome and outwardly through the offtake pipe $o$ and the purger $p$. At the same time the hydrogen liberated at the cathode will pass through the short ducts $d^2$ to the conduit formed by the various openings $d'$ and will discharge in like manner and under like conditions from the nozzle $j'$ into the dome $j$ and out through the offtake pipe $o'$ to the purger $q$.

Inasmuch as the electrolyte supply pipe $k$, in addition to supplying electrolyte from both domes to the opposite sides of the diaphragm in each cell, forms a channel of communication between the two domes, the gas pressure in both domes and through the apparatus will be automatically regulated through variance in the level of the electrolyte in the domes in a manner to be uniform at all times.

As the gas passes from each dome through the offtake pipe $o$—$o'$ it will pass through the inlet nipple $p^3$ in the purger $p$ or $q$ to within the compartment formed by the partition $p^2$ bubbling through the water in said purger and passing outwardly through the pipe $p'$ or $q'$ to the gasometer or other receptacle.

In the event of excess pressure from said gasometer or other receptacle, the fluid seal in the well $p^5$ will be broken and at the same time the water within the main body of the purger will be caused to flow into and seal the nipple $p^3$ thus preventing back flow of gases to the apparatus itself. The gases passing through the purger will be washed.

In the event of the closing down of the apparatus or the cessation of the flow of gas from any cause whatsoever, the purger will act as a seal to prevent back flow of gas from a gasometer or other receptacle to the cells of the gas domes. In the event of a break in the pipe from the gas domes to the purger, the escape of gas from the gasometer is thus prevented.

As the gases pass from the purger, they enter the first insulating section formed by the glass tube $s^3$ through the reduced opening $s'$ in the fitting $s$, being projected against the baffle $s^2$ in a manner to tend to separate from the gas the liquid carried in suspension thereby. From this insulating connection the gas passes through the opening $t'$ in the fitting $t$, to the second insulating connection formed by the glass tube $t^3$ impinging in this instance against the baffle $t^2$ with a similar separating effect. From the tube $t^5$ they pass through the fitting $u$ to the pipe $r$ or $r'$ to the gasometer or other receptacle. I preferably use two insulating sections to guard against inefficiency of one section at times, although a single section might be used to advantage. By reducing the volume of the liquid passing through the insulating section to a minimum, danger of grounding of the current through the offtake system is minimized. In the apparatus shown I have found, in actual use, that perfect insulation of the apparatus is secured.

With the decomposition of the electrolyte, feed water is delivered from the tank $m$ through the pipe $l$ to the conduit feed pipe $k$ in a manner to replace the water decomposed in the apparatus.

The sight gages $i^3$—$j^3$—$m^2$ are conveniently positioned to permit the operator to inspect the interior of the respective domes, and the feed water supply tank at any time. The use of prismatic glass makes the reading clearer than with plain glass.

In the event that the level of the electrolyte in either dome $i$ or $j$ becomes so low as to expose the open bottom of the tube $n$ above the electrolyte, the gas in the dome will sound the audible signal $n'$ and apprise the operator of the development of trouble in the apparatus. If it be necessary to close down the apparatus, the purgers $p$—$q$ will prevent backflow of the gas from the gasometers or other receptacles to the apparatus so that the apparatus may be dismantled at any time for the purpose of repair.

The standards A and B are mounted upon insulating material in the usual and well-known manner.

In assembling the device any desired number of electrodes may be used.

The apparatus may be drained through the fittings $C^3$—$C^4$.

In filling the purger $p$ or $q$ the pet-cock $p^9$ should be open for purposes of venting the purger.

By providing a structure wherein the gas will accumulate in the offtake ducts formed by the openings $e'$—$d'$ until a pressure sufficiently great to overcome the pressure at the discharge end of the nozzle $j'$ has been developed, I prevent flowing of water through said gas offtake conduit and thus prevent a continued circulation of the electrolyte from the domes through the cells and back to the domes. At the same time I avoid conditions in the cells which might lead to the disintegration or distortion of the diaphragm.

It is not my intention to limit the invention to the details of construction of the particular design shown in the accompanying drawings, it being apparent that such may be varied without departing from the spirit and scope of the invention.

Having described the invention what I claim as new and desire to have protected by Letters Patent is:—

1. An electrolytic apparatus embodying therein a plurality of bi-polar electrodes each having at the top and at the bottom thereof two non-communicating openings adapted to form with similar openings in adjacent electrodes continuous ducts, a plurality of diaphragms dividing the cells formed by succeeding electrodes, a plurality of non-communicating gas domes adapted to contain electrolyte and to receive gas from said cells, a nozzle having a downwardly presented discharge in each of said domes, said nozzles respectively communicating with the ducts at the top of said electrode and being submerged in the electrolyte in said dome, a pipe connection extending from the bottom of one of said domes to the bottom of the other, branch pipes leading therefrom and communicating respectively with the ducts at the bottom of said electrodes and independent non-communicating means whereby gas is withdrawn from said domes respectively.

2. An electrolytic apparatus embodying therein a plurality of bi-polar electrodes, each having at the top and at the bottom thereof two non-communicating openings adapted to form with similar openings in adjacent electrodes continuous ducts, a plurality of diaphragms dividing the cells formed by succeeding electrodes, a plurality of non-communicating gas domes adapted to contain electrolyte and to receive gas from said cells, a nozzle having a downwardly presented discharge in each of said domes, said nozzles respectively communicating with the ducts at the top of said electrode and being submerged in the electrolyte in said dome, a pipe connection extending from the bottom of one of said domes to the bottom of the other, branch pipes leading therefrom and communicating respectively with the ducts at the bottom of said electrodes, means delivering distilled water to the electrolyte flowing to the electrodes, and independent non-communicating means whereby gas is withdrawn from said domes respectively.

3. An electrolytic apparatus embodying therein a plurality of bi-polar electrodes each having at the top and at the bottom thereof two non-communicating openings adapted to form with similar openings in adjacent electrodes continuous ducts, a plurality of diaphragms dividing the cells formed by succeeding electrodes, a plurality of non-communicating gas domes adapted to contain electrolyte and to receive gas from said cells, a nozzle having a downwardly presented discharge in each of said domes, said nozzles respectively communicating with the ducts at the top of said electrode and being submerged in the electrolyte in said dome, a pipe connection extending from the bottom of one of said domes to the bottom of the other, branch pipes leading therefrom communicating respectively with the ducts at the bottom of said electrodes, a tank adjacent said domes adapted to contain distilled water, a pipe leading therefrom and tapping said pipes connecting said domes whereby distilled water is delivered to the electrolyte flowing through said pipe to said electrode.

4. An electrolytic apparatus embodying therein a plurality of bi-polar electrodes, each having at the top and at the bottom thereof two non-communicating openings adapted to form with similar openings in adjacent electrodes continuous ducts, a plurality of diaphragms dividing the cells formed by succeeding electrodes, a plurality of non-communicating gas domes adapted to contain electrolyte and to receive gas from said cells, a nozzle having a downwardly presented discharge in each of said domes, said nozzles respectively communicating with the ducts at the top of said electrode and being submerged in the electrolyte in said dome, a pipe connection extending from the bottom of one of said domes to the bottom of the other branch pipes leading therefrom communicating respectively with the ducts at the bottom of said electrode, a tank adjacent said domes adapted to contain distilled water, a pipe leading therefrom and tapping said pipes connecting said domes whereby distilled water is delivered to the electrolyte flowing through said pipe to said electrodes, a reservoir for distilled water, a pipe leading therefrom, and discharging into said tank, means automatically actuated by the water in said tank whereby the flow of water from said reservoir through said tank is controlled and independent, non-communicating means whereby gas is withdrawn from said domes respectively.

5. An electrolytic apparatus embodying therein a series of cells, a diaphragm dividing each of said cells whereby an electrolyte may be decomposed therein, means for withdrawing the gases from said cells and means delivering electrolyte to all of said cells to replace the decomposed electrolyte consisting of independent storage tanks for electrolyte, means whereby the electrolyte from said tank is delivered to opposite sides of the diaphragm of each cell and a reservoir for distilled water to replace the electrolyte decomposed and means delivering electrolyte from said reservoir including therein a tank, and a pipe connection between said tank and the means delivering the electrolyte to the several cells, a pipe connection between said reservoir and said tank and means actuated automatically by the change of level of the water in said tank for controlling the flow of water from said reservoir to said tank.

6. An electrolytic apparatus embodying therein end standards, rods connecting said standards, a plurality of bi-polar electrodes, each having side lugs thereon extending across said rods, insulating means between said lugs and said rods, means pressing said electrodes together, means delivering electrolyte to the cells formed by the electrodes and means whereby the gases are withdrawn from said cell.

7. An electrolytic apparatus embodying therein end standards, rods connecting said standards, a covering of insulating material for each of said rods, a plurality of bi-polar electrodes each having lugs thereon extending across said rods, blocks of insulating material interposed between said lugs and said rods and slidable upon said rods, means pressing said electrodes together, means delivering electrolyte to the cells formed by the electrode and means whereby the gases may be withdrawn from said cells.

8. An electrolytic apparatus embodying therein a plurality of bi-polar electrodes each having at the top and at the bottom thereof two non-communicating openings adapted to form with similar openings in adjacent electrodes continuous ducts, a plurality of diaphragms dividing the cells formed by succeeding electrodes, a plurality of non-communicating gas domes adapted to contain electrolyte and to receive gas from said cells, a nozzle having a downwardly presented discharge in each of said domes, said nozzles respectively communicating with the ducts at the top of said electrode and being submerged in the electrolyte in said dome, a pipe connection extending from the bottom of one of said domes to the bottom of the other, branch pipes leading therefrom and communicating respectively with the ducts at the bottom of said electrodes, a gas offtake pipe leading from each of said domes, and discharging into a purger and a pipe leading from said purger.

9. An electrolytic apparatus embodying therein a plurality of bi-polar electrodes each having at the top and at the bottom thereof two non-communicating openings adapted to form with similar openings in adjacent electrodes continuous ducts, a plurality of diaphragms dividing the cells formed by succeeding electrodes, a plurality of non-communicating gas domes adapted to contain electrolyte and to receive gas from said cells, a nozzle having a downwardly presented discharge in each of said domes, said nozzles respectively communicating with the ducts at the top of said electrode and being submerged in the electrolyte in said dome, a pipe connection extending from the bottom of one of said domes to the bottom of the other, branch pipes leading therefrom and communicating respectively with the ducts at the bottom of said electrodes, a gas offtake pipe leading from each of said domes, and discharging into a purger consisting of a tank having a partition therein forming a chamber opening at the top, a nipple communicating with the pipe leading from said dome and discharging within said chamber, a well formed in the side of said tank and a partition carried by the top of said purger and projecting into said well whereby a liquid seal is formed and a pipe leading from said purger and communicating therewith adjacent the top thereof whereby the gases delivered to said purger will pass through liquid contained in said purger and will pass outwardly through said last named pipe and back pressure through said last named pipe upon the cells is prevented.

10. An electrolytic apparatus embodying therein a plurality of cells, a diaphragm separating the elements of each cell, a plurality of non-communicating gas domes adapted to contain electrolyte and to receive gas from said cell, means whereby electrolyte is conveyed from said domes respectively and said cells, each of said domes having through the wall thereof an elongated opening, a glass plate closing said opening, means forming a gas and liquid tight joint about said plate whereby the water level in each of said domes is visible exteriorly thereof and means withdrawing gas from said domes respectively.

11. An electrolytic apparatus embodying therein a plurality of cells, a diaphragm separating the elements of each cell, a plurality of non-communicating gas domes adapted to contain electrolyte and to receive gas from said cell, means whereby electrolyte is conveyed from said domes respectively and said cells, a feed water tank adapted to contain distilled water, pipe connections between said tank and the means delivering water from said domes to said electrolyte, said tank having through the wall thereof a vertically elongated opening, a glass plate closing said opening, means forming a liquid tight joint between said plate and said tank whereby the level of the water in said tank is visible exteriorly of the apparatus and means withdrawing the gases from said domes respectively.

12. An electrolytic apparatus embodying therein a series of cells, the elements of said cell being separated by a diaphragm, a plurality of domes adapted to supply electrolyte to said cells and to receive gases therefrom, means whereby gases may be withdrawn from said domes respectively and an audible signal carried by each of said domes, and operative by gas pressure, a portion of said signal within said dome being positioned below the maximum low level of the electrolyte therein.

13. An electrolytic apparatus embodying therein a series of cells, the elements of said cell being separated by a diaphragm, a plurality of domes adapted to supply electrolyte to said cells and to receive gases therefrom, means whereby gases may be withdrawn from said domes respectively, an audible signal device arranged exteriorly of each of said domes, said device being adapted to be operated by the gas pressure within said domes respectively, and a pipe connection leading from said signal and terminating within said dome at a point below the maximum level of the electrolyte therein whereby a signal will be sounded if the electrolyte pressure goes below said level.

14. An electrolytic apparatus embodying therein a cell adapted to decompose an electrolyte, means whereby gas is withdrawn from said cell and delivered to a storage tank or bell, said means including therein a tubular section of insulating material through which said gases pass and means preventing the formation of a continuous liquid film upon the inner surface of said tubular section.

15. An electrolytic apparatus embodying therein a cell adapted to decompose electrolyte and means whereby gas is withdrawn from said cell and delivered to a storage tank or bell, said means including therein a tubular section of insulating material through which said gases pass and means whereby a direct flow of the gases is prevented and liquid carried in suspension therein is separated therefrom.

16. An electrolytic apparatus embodying therein a cell adapted to decompose electrolyte, and means whereby gas is withdrawn from said cell and delivered to a storage tank or bell, said means including therein a pipe section in communication with said cell, a pipe section in communication with said tank or bell, a glass tube connecting said pipe sections and means forming a gas tight joint between said tube and said pipe sections respectively.

17. An electrolytic apparatus embodying therein a cell adapted to decompose an electrolyte, and means whereby gas is withdrawn from said cell and delivered to a storage tank or bell, said means including therein a pipe section in communication with said cell, a fitting carried by said pipe having an annular seat upon the top thereof and a vertical opening extending therethrough communicating with said pipe, a baffle cap positioned above and away from said opening whereby a direct flow of the gases therethrough is prevented and liquid carried in suspension in the gases is separated therefrom, a glass tube mounted in said annular seat, a second fitting surmounting said tube and having an annular seat engaging the top edge thereof, a nipple carried by said fitting projecting below said tube and means whereby gases passing through said last named fitting are conveyed to said tank or bell.

18. An electrolytic apparatus embodying therein a cell adapted to decompose an electrolyte and means whereby gas is withdrawn from said cell and delivered to a storage tank or bell, said means including therein a pipe section in communication with said cell, a fitting carried by said pipe having an annular seat upon the top thereof and a vertical opening extending therethrough communicating with said pipe, a baffle cap positioned above and away from said opening whereby a direct flow of the gases therethrough is prevented and liquid carried in suspension in the gases is separated therefrom, a glass tube mounted in said annular seat, a second fitting surmounting said tube and having an annular seat engaging the top edge thereof, a nipple carried by said fitting projecting below said tube, a baffle cap positioned above and away from the discharge end of said nipple, said last named fitting having an annular seat upon the top thereof, and a fitting surmounting said last named tube, a second glass tube mounted in said last named tube and a pipe connection between said last named fitting and the tank or bell.

19. An electrolytic apparatus embodying therein a cell adapted to decompose an electrolyte and means whereby gas is withdrawn from said cell and delivered to a storage tank or bell, said means including therein a pipe section in communication with said cell, a fitting carried by said pipe having an annular seat upon the top thereof and a vertical opening extending therethrough communicating with said pipe, a baffle cap positioned above and away from said opening whereby a direct flow of the gases therethrough is prevented and liquid carried in suspension in the gases is separated therefrom, a glass tube mounted in said annular seat, a second fitting surmounting said tube and having an annular seat engaging the top edge thereof, a nipple carried by said fitting projecting below said tube, a baffle cap positioned above and away from the discharge end of said nipple, said last named fitting having an annular seat upon the top thereof, a second glass tube mounted in said last named seat, a fitting surmounting said last named tube, a nipple carried thereby projecting within and spaced away from said last named tube.

20. An electrolytic apparatus embodying therein a cell adapted to decompose an electrolyte and means whereby gas is withdrawn from said cell and delivered to a storage tank or bell, said means including therein a pipe section in communication with said cell, a fitting carried by said pipe having an annular seat upon the top thereof and a vertical opening extending therethrough communicating with said pipe, a baffle cap positioned above and away from said opening whereby a direct flow of the gases therethrough is prevented and liquid carried in suspension in the gases is separated therefrom, a glass tube mounted in said annular seat, a second fitting surmounting said tube and having an annular seat engaging the top edge thereof, a nipple carried by said fitting projecting below said tube, a baffle cap positioned above and away from the discharge end of said nipple, said last named fitting having an annular seat upon the top thereof, a drain pipe communicating with said channel and means preventing the escape of gas from said drain pipe and a fitting surmounting said last named seat, and a channel between the discharge end of said nipple and said seat adapted to accumulate the liquid separated from the gases by said baffle plate and a second glass tube mounted in said last named tube and a pipe connection between said last named fitting and the tank or bell.

In witness whereof, I hereunto affix my signature in the presence of two subscribing witnesses, this 22nd day of October, 1915.

ISAAC H. LEVIN.

Witnesses:
CLARICE FRANCK,
JUDITH PARDEE.